United States Patent
Yu et al.

(10) Patent No.: US 10,998,741 B2
(45) Date of Patent: May 4, 2021

(54) CHARGER

(71) Applicant: Huawei Technologies Co., Ltd., Shenzhen (CN)

(72) Inventors: Wenchao Yu, Shanghai (CN); Chong Wen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 211 days.

(21) Appl. No.: 16/341,712

(22) PCT Filed: Oct. 14, 2016

(86) PCT No.: PCT/CN2016/102196
§ 371 (c)(1),
(2) Date: Apr. 12, 2019

(87) PCT Pub. No.: WO2018/068323
PCT Pub. Date: Apr. 19, 2018

(65) Prior Publication Data
US 2020/0052510 A1 Feb. 13, 2020

(51) Int. Cl.
*H02J 7/00* (2006.01)
*H02J 7/02* (2016.01)

(52) U.S. Cl.
CPC .............. *H02J 7/0031* (2013.01); *H02J 7/00* (2013.01); *H02J 7/0042* (2013.01); *H02J 7/027* (2013.01); *H02J 2207/20* (2020.01)

(58) Field of Classification Search
CPC ........................................................ H02J 7/00
See application file for complete search history.

(56) References Cited

U.S. PATENT DOCUMENTS

| | | | |
|---|---|---|---|
| 9,246,342 B2 | 1/2016 | Kondo | |
| 2017/0271897 A1* | 9/2017 | Wen | ............... H02J 7/0029 |
| 2018/0026471 A1 | 1/2018 | Lu et al. | |

FOREIGN PATENT DOCUMENTS

| | | |
|---|---|---|
| CN | 101945534 A | 1/2011 |
| CN | 103532187 A | 1/2014 |
| CN | 104767260 A | 7/2015 |
| CN | 205610274 U | 9/2016 |
| EP | 2228884 A2 | 9/2010 |
| WO | 2016106616 A1 | 7/2016 |
| WO | 2016153576 A1 | 9/2016 |

OTHER PUBLICATIONS

INTERSIL, "High-Speed USB 2.0 (480Mbps) DPST Switch with Overvoltage Protection (OVP) and Dedicated Charger Port Detection," Sep. 5, 2013, 18 pages.

* cited by examiner

*Primary Examiner* — Robert Grant
(74) *Attorney, Agent, or Firm* — Slater Matsil, LLP

(57) ABSTRACT

Some embodiments of the present invention provide a charger. According to the charger, a detection signal generation circuit actively sends a detection signal; a feedback circuit detects level signals on a sampling component, and generates a feedback signal according to the level signals; a switch component controls, according to the feedback signal, the charger to output a charging voltage; and when the level signals meet a preset condition (the preset condition is a preset condition that the level signals meet when an abnormal short circuit occurs on a charging interface), the switch component controls the charger to stop outputting the charging voltage.

19 Claims, 6 Drawing Sheets

CHARGER

CROSS-REFERENCE TO RELATED APPLICATIONS

This application is a National Stage of International Application No. PCT/CN2016/102196, filed on Oct. 14, 2016, which is hereby incorporated by reference in its entirety.

TECHNICAL FIELD

The present invention relates to the circuit field, and in particular, to a charger.

BACKGROUND

With continuous development of mobile terminals, especially, continuous development of mobile phones, requirements on security performance of chargers (adapters) continuously increase. Impedance on an output terminal of a charging cable of a charger and an input interface of a mobile terminal usually decreases due to entry of water or another foreign matter. As a result, when an adapter is powered on, a cable emits heat and even is burnt. Currently, this problem has become a main problem urgent to be resolved by mainstream mobile phone manufacturers.

Currently, a common method for giving a water entry warning is used for mobile phones to handle abnormalities. When water spots exist on a charging interface, a warning is immediately given by detecting a voltage change on the interface. However, in this manner, only a warning can be given but no protection action can be taken, detection precision is poor, and a false warning rate is high. If a user has not noticed the warning and still charges a mobile phone, a cable still emits heat and even is damaged.

SUMMARY

Some embodiments of this application provide a charger and a method for detecting a short circuit on a charging interface, to resolve a problem that when an adapter is powered on, a cable emits heat and even is burnt due to entry of water or another foreign matter.

The charger and a charging abnormality detection method that are provided in the embodiments of the present invention are not affected by a working status of the charger, and are applicable both when an electronic device is connected to the charger, that is, the charger charges the electronic device, and when no electronic device is connected to the charger, that is, the charger is in a no load state.

According to an aspect, some embodiments of this application provide a charger. The charger includes a detection signal generation circuit, a sampling component, a feedback circuit, a switch component, a charging circuit, and a charging interface. The charging interface includes data transmission pins and a power pin. The charging circuit receives a power input signal, and generates the charging voltage according to the power input signal, where the charging voltage is output through the power pin. The detection signal generation circuit is configured to output a detection signal, where an output terminal of the detection signal generation circuit is connected to one of the data transmission pins. The sampling component is connected in series to an output cable of the detection signal generation circuit. The feedback circuit is connected to the sampling component and the switch component, and is configured to: detect level signals on two terminals of the sampling component, generate a feedback signal according to the level signals, and transfer the feedback signal to the switch component. The switch component is connected in series to a power input cable of the charging circuit or is connected in series to a connection cable between the charging circuit and the power pin, and the switch component is configured to: receive the feedback signal, and control, according to the feedback signal, the charger to output the charging voltage. When the level signals meet a preset condition, the feedback circuit generates a first feedback signal, and the switch component controls, according to the first feedback signal, the charger to stop outputting the charging voltage; or when the level signals do not meet the preset condition, the feedback circuit generates a second feedback signal, and the switch component controls, according to the second feedback signal, the charger to output the charging voltage.

With reference to the foregoing some embodiments, according to the charger, the detection signal generation circuit actively sends the detection signal; the feedback circuit detects the level signals on the sampling component, and generates the feedback signal according to the level signals; the switch component controls, according to the level signals, the charger to output the charging voltage; and when the level signals meet the preset condition (the preset condition is a preset condition that the level signals meet when an abnormal short circuit occurs on the charging interface), the switch component controls the charger to stop outputting the charging voltage. Therefore, it is actively detected whether an abnormal short circuit occurs on the charging interface of the charger (because impedance abnormally decreases due to entry of water or a foreign matter), so as to effectively avoid a damage to the charger or a charged device.

In some embodiments, the switch component is connected in series to the connection cable between the charging circuit and the power pin, to control a connection between the charging circuit and the power pin. The switch component disconnects the charging circuit from the power pin according to the first feedback signal, and the power pin stops outputting the charging voltage, so that the charger stops outputting the charging voltage. Alternatively, the switch component connects the charging circuit to the power pin according to the second feedback signal.

In some other embodiments, the switch component is connected in series to the power input cable of the charging circuit, to control input of the power input signal of the charging circuit. The switch component breaks an input path of the power input signal of the charging circuit according to the first feedback signal, and the charging circuit stops generating the charging voltage, so that the charger stops outputting the charging voltage. Alternatively, the switch component forms an input path of the power input signal of the charging circuit according to the second feedback signal.

In some embodiments, the switch component is a PWM circuit, and the PWM circuit is configured to generate a PWM signal. The PWM circuit is connected in series to the power input cable of the charging circuit, and controls input of the power input signal of the charging circuit, to control the charging circuit to generate the charging voltage.

It should be noted that the PWM signal is a square wave signal.

In some embodiments, according to the first feedback signal, the PWM circuit stops outputting the PWM signal or adjusts a duty cycle of the PWM signal to 0 or 100%, to control the charging circuit to stop generating the charging voltage; or the PWM circuit outputs the PWM signal according to the second feedback signal, to control the charging circuit to generate the charging voltage.

In some embodiments, the charging circuit includes a switch element and a transformer. The switch element is connected to a primary side of the transformer, and the switch element receives the PWM signal and is periodically turned off or turned on according to the PWM signal, to control the primary side of the transformer to receive the power input signal. A secondary side of the transformer generates the charging voltage according to the power input signal received by the primary side of the transformer, and outputs the charging voltage through the power pin.

In some embodiments, the feedback circuit is a comparator circuit, an operational amplifier circuit, or an analog-to-digital conversion circuit. Two input terminals of the feedback circuit are respectively connected to the two terminals of the sampling component, to obtain the level signals, and an output terminal of the feedback circuit is connected to the switch component, to transfer the feedback signal to the switch component.

In some embodiments, the charger further includes at least one voltage regulation component, where the voltage regulation component is connected in series to an input cable of the feedback circuit. The voltage regulation component provides a reference voltage, and the reference voltage provides an allowed range of a detection error.

In some embodiments, the voltage regulation component is a reference voltage source.

In some embodiments, the charger further includes a capacitor, where the capacitor is connected in series to an input cable of the feedback circuit. According to a gradual charging principle of the capacitor, only when a particular time passes after level signals meeting the preset condition are input, or a plurality of consecutive level signals meeting the preset condition are input, a responsive level value is reached on an input cable terminal of the feedback circuit, and a corresponding feedback signal is generated, so that erroneous determining caused by an interference voltage is avoided.

In some embodiments, the detection signal generation circuit is a direct current signal generation circuit, a square wave signal generation circuit, a pulse signal generation circuit, or a half-wave signal generation circuit.

In some example embodiments, the detection signal generation circuit outputs an alternating current detection signal. In addition, the sampling component is added to a loop, and the feedback circuit collects alternating current signals from the sampling component. During detection performed by using the alternating current detection signal, the alternating current detection signal has low energy, and therefore causes no damage to a cable. In addition, pulses of a plurality of alternating current signals are sampled, so that sampling precision can be further improved, and erroneous determining likely to be caused by a single time of determining can be avoided.

In some embodiments, the sampling component is a sampling resistor or a sampling inductor.

It should be noted that the detection signal generation circuit may continuously or periodically output detection signals, and the feedback circuit may also continuously or periodically detect level signals on the two terminals of the sampling component, to implement real-time abnormality protection.

In some embodiments, the switch element is an NMOS transistor.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some but not all embodiments of the present invention. Persons of ordinary skill in the art may still derive other drawings from these accompanying drawings without creative efforts.

DETAILED DESCRIPTION OF ILLUSTRATIVE EMBODIMENTS

Figure 1:
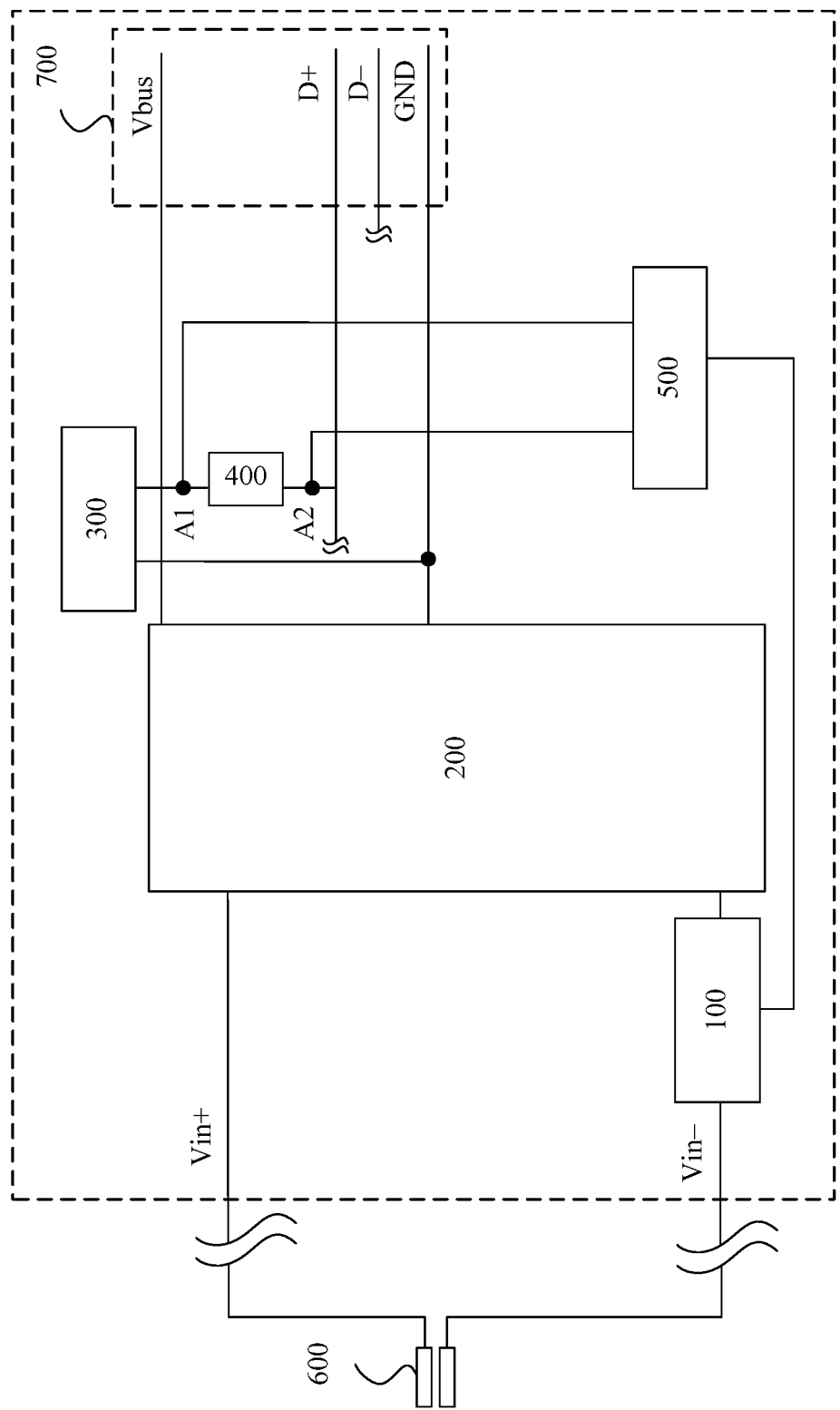
FIG. 1 to FIG. 5 are structural block diagrams of examples of a charger according to some embodiments.

The following further describes the technical solutions in the embodiments of the present invention with reference to the accompanying drawings in the embodiments of the present invention.

For ease of understanding the embodiments of the present invention, several related concepts are first introduced.

1. Pulse-Width Modulation (PWM)

PWM is an analog control manner in which an offset of a base of a transistor or a gate of an MOS transistor is modulated according to a change of corresponding load, to change a turning-on time of the transistor or the MOS transistor, and further change output of a switching regulated power supply. In this manner, an output voltage of the power supply can remain constant when a working condition changes, and this manner is an extremely effective technology of controlling an analog circuit by using a digital signal of a microprocessor.

PWM includes phase voltage control PWM, a pulse width PWM method, random PWM, an SPWM method, line voltage control PWM, and the like. For a smart charger with NiMH batteries, the pulse width PWM method is usually used. In this method, a pulse train in which all pulses has an equal width is used as a PWM waveform signal, frequency modulation may be performed by changing a cycle of the pulse train, and voltage regulation may be performed by changing the pulse width or a duty cycle. The duty cycle is a time proportion of a high level in one pulse cycle. For example, a duty cycle of a PWM wave with 1-second high level and 1-second low level is 50%. A voltage and a frequency can be changed in a coordinated manner by using an appropriate control method. Therefore, a charging voltage can be controlled by adjusting a PWM cycle or a PWM duty cycle.

The MOS transistor is a metal (metal)-oxide (oxide)-semiconductor (semiconductor) field effect transistor, is a switch component that is widely applied currently, and has a relatively fast switching speed.

A short circuit refers to a case in which two points at different electric potential in a normal circuit directly contact with each other incorrectly or are connected by a conductor having extremely small impedance (or resistance). The short circuit may be understood that a low-impedance closed circuit is formed between two points in a circuit. For example, when a low-impedance closed circuit is formed because water or another conductive matter enters a charging interface of a charger, a short circuit occurs on the charging interface.

A charger and a charging abnormality detection method that are provided in some embodiments of the present invention are not affected by a working status of the charger, and are applicable both when an electronic device is connected to the charger, that is, the charger charges the electronic device, and when no electronic device is connected to the charger, that is, the charger is in a no load state.

With reference to the foregoing descriptions, some embodiments provide a charger. The charger includes a detection signal generation circuit, a sampling component, a feedback circuit, a switch component, a charging circuit, and a charging interface. The charging interface includes data transmission pins and a power pin. The charging circuit receives a power input signal, and generates the charging voltage according to the power input signal, where the charging voltage is output through the power pin. The detection signal generation circuit is configured to output a detection signal, where an output terminal of the detection signal generation circuit is connected to one of the data transmission pins. The sampling component is connected in series to an output cable of the detection signal generation circuit. The feedback circuit is connected to the sampling component and the switch component, and is configured to: detect level signals on two terminals of the sampling component, generate a feedback signal according to the level signals, and transfer the feedback signal to the switch component. The switch component is connected in series to a power input cable of the charging circuit or is connected in series to a connection cable between the charging circuit and the power pin, and the switch component is configured to: receive the feedback signal, and control, according to the feedback signal, the charger to output the charging voltage. When the level signals meet a preset condition, the feedback circuit generates a first feedback signal, and the switch component controls, according to the first feedback signal, the charger to stop outputting the charging voltage; or when the level signals do not meet the preset condition, the feedback circuit generates a second feedback signal, and the switch component controls, according to the second feedback signal, the charger to output the charging voltage.

FIG. 1 is a brief schematic structural diagram of a charger according to some embodiments. As shown in FIG. 1, the charger includes a switch component 100, a charging circuit 200, a detection signal generation circuit 300, a sampling component 400, a feedback circuit 500, and a charging interface 700.

In some embodiments, the charging interface 700 may be a micro USB interface, that is, a portable version of a Universal Serial Bus 2.0 (USB 2.0) standard. The charging interface 700 usually includes a power pin Thus, a ground pin GND, and two data transmission pins D+ and D−. In addition, for an interface matching the Type C standard defined in Universal Serial Bus 3.1 (the USB 3.1 specification), the charging interface 700 may further include another signal cable defined for the Type-C interface.

It should be noted that a micro USB charging interface is used as an example for description in this embodiment of the present invention, but is not intended to limit the present invention. After reading this patent application, persons skilled in the art may apply the solution of this embodiment of the present invention to a charging interface of another type (for example, USB Type-C) without creative efforts.

In some embodiments, the charger may further include a microprocessor (not shown). In a charging process, the microprocessor communicates with a charged device through the data transmission pins, to obtain information about a charging status of the charged device, and adjusts a charging current at any time, to cooperatively implement a flash charging function, a fast charging function, and the like.

The charger further includes a charging plug 600, an alternating current/direct current conversion circuit (not shown), and a voltage conversion circuit (not shown). The charging plug 600 of the charger is connected to an external power supply. An external alternating current is converted into a direct current after passing through the alternating current/direct current conversion circuit in the charger, and then a voltage is adjusted through the voltage conversion circuit, to form a power input signal. The power input signal is input from power input cables Vin+ and Vin− of the charging circuit 200. The charging circuit 200 outputs a charging voltage to the power pin Vbus, and the charger outputs the charging voltage from the power pin Vbus.

In some embodiments, two output terminals of the detection signal generation circuit 300 are respectively connected to the data transmission pin (D+ or D−) and the ground pin GND. The detection signal generation circuit 300 is configured to send a detection signal through the data transmission pin (D+ or D−). The sampling component 400 is connected in series to an output cable of the detection signal generation circuit 300. When the data transmission pin D+ and/or the data transmission pin D− and the ground pin GND form a closed circuit, the feedback circuit 500 can collect, from the sampling component 400, level signals in response to the detection signal.

The detection signal generation circuit 300 sends the detection signal. The detection signal generation circuit 300 is a direct current signal generation circuit, and the detection signal that is output by the detection signal generation circuit 300 is a direct current signal. Correspondingly, a sampled signal is also a direct current signal.

In some embodiments, the detection signal generation circuit 300 is an alternating current signal (AC signal) generation circuit, and may be a square wave signal generation circuit, a half-wave signal generation circuit, or a pulse signal generation circuit.

The sampling component 400 is connected in series to the output cable of the detection signal generation circuit 300.

In some embodiments, as shown in FIG. 1, an output terminal of the detection signal generation circuit 300 is connected to the data transmission pin D+, the detection signal generation circuit 300 is configured to output the detection signal through the data transmission pin D+, and the sampling component 400 is connected in series to an output cable that is of the detection signal generation circuit 300 and that is connected to the data transmission pin D+.

Figure 2:
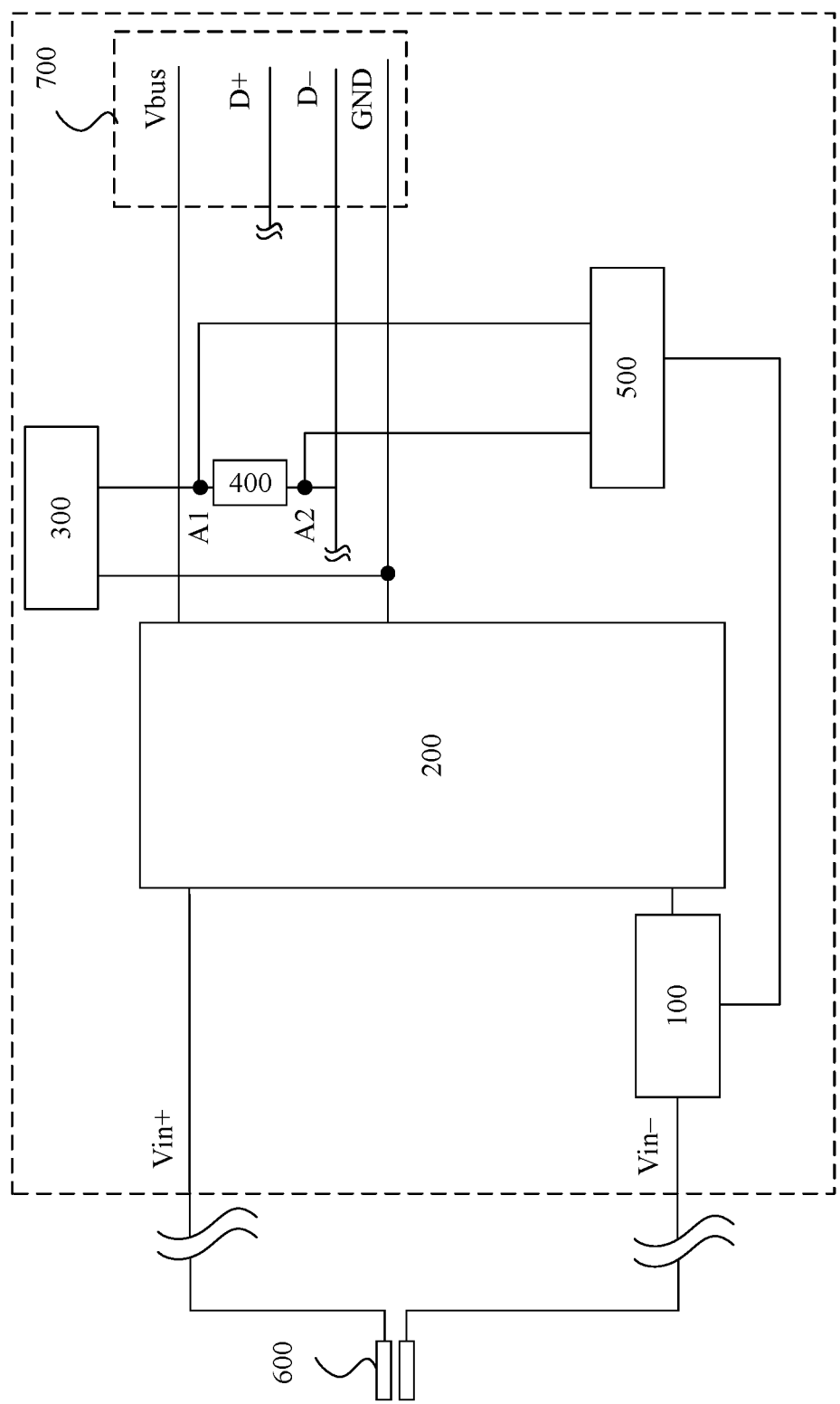

In some embodiments, as shown in FIG. 2, one of the output terminals of the detection signal generation circuit 300 is connected to the data transmission pin D−, and the sampling component 400 is connected in series to an output cable that is of the detection signal generation circuit 300 and that is connected to the data transmission pin D−.

Figure 3:
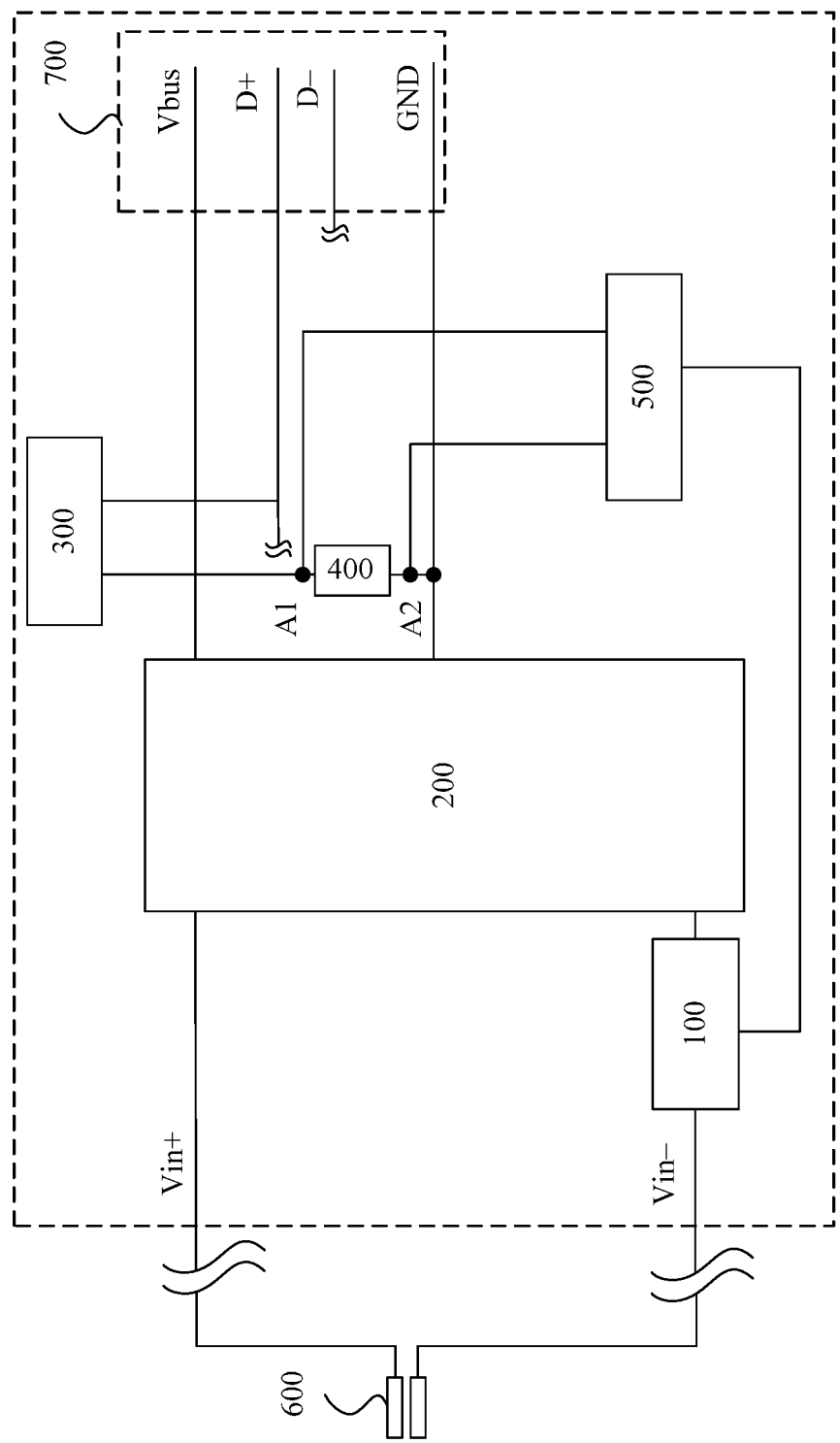

In some embodiments, as shown in FIG. 3, an output terminal of the detection signal generation circuit 300 is connected to the data transmission pin D+, and the sampling component 400 is connected in series to a connection cable between the detection signal generation circuit 300 and the ground pin GND. In addition, an output terminal of the detection signal generation circuit 300 may alternatively be connected to the data transmission pin D−, and the sampling component 400 is connected in series to a connection cable between the detection signal generation circuit 300 and the ground pin GND.

The feedback circuit 500 is connected to the sampling component 400 and the switch component 100, and is configured to: detect level signals on two terminals of the sampling component 400, generate a feedback signal according to the level signals, and transfer the feedback signal to the switch component 100.

The feedback circuit 500 may be a comparator, an operational amplifier, or an ADC circuit (analog-to-digital conversion circuit).

Figure 6:
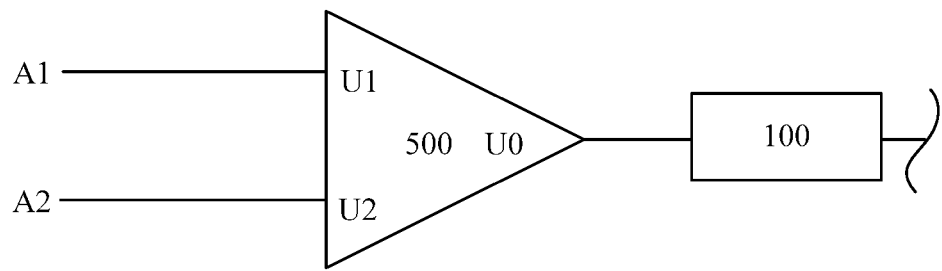
FIG. 6 and FIG. 7 are structural block diagrams of examples of a feedback circuit according to some embodiments.

FIG. 6 is a structural block diagram of an example of a feedback circuit according to some embodiments. Two input terminals of the feedback circuit 500 are respectively connected to the two terminals of the sampling component 400, to detect the level signals on the two terminals A1 and A2 of the sampling component 400, and the feedback circuit 500 generates the feedback signal according to the level signals. The sampling component 400 may be a resistor or an inductor.

The feedback circuit 500 determines whether the detected level signals meet a preset condition (for example, the level signals are greater than the preset threshold). When the level signals meet the preset condition, the feedback circuit generates a first feedback signal and transfers the first feedback signal to the switch component, and the switch component controls, according to the first feedback signal, the charger to stop outputting the charging voltage.

In some embodiments, the feedback circuit 500 respectively outputs a high-level feedback signal and a low-level feedback signal according to a comparison result. When the feedback circuit 500 outputs the first feedback signal (for example, a low-level signal), the switch component 100 is controlled to directly break an input path of the power input signal of the charging circuit 200 or break a closed circuit of an output cable of the power pin Vbus, to control the charger to stop outputting the charging voltage. When the feedback circuit 500 outputs the second feedback signal (for example, a high-level signal), the switch component 100 is controlled to form an input path of the power input signal of the charging circuit 200 or form a closed circuit of an output cable of the power pin Vbus, so that the charger outputs the charging voltage.

If the first feedback signal is a low-level signal, the second feedback signal is a high-level signal; or if the first feedback signal is a high-level signal, the second feedback signal is a low-level signal. Specifically, this may be adaptively adjusted according to a design requirement.

For ease of description, an example in which the first feedback signal is a low-level signal and the second feedback signal is a high-level signal is used in this embodiment of the present invention.

Figure 7:
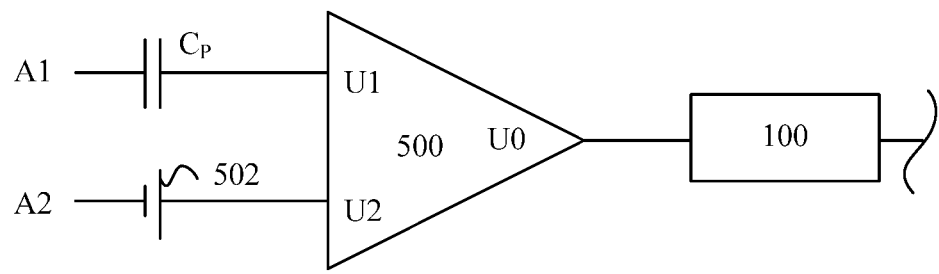

FIG. 7 is a structural block diagram of an example of a feedback circuit according to some embodiments. The charger further includes a voltage regulation component 502 (for example, a reference voltage source or a voltage division component). One input terminal U2 of the feedback circuit 500 is connected to one terminal of the voltage regulation element 502, and the other terminal of the voltage regulation component 502 is connected to one terminal A2 of the sampling component 400. The other input terminal U1 of the feedback circuit 500 is connected to one terminal A1 of the sampling circuit 400. An output terminal U0 of the feedback circuit 500 is connected to the switch component 100. In some embodiments, the voltage regulation component 502 provides an allowed range of a detection error, to avoid erroneous determining caused by an interference voltage. A level value of the input terminal U2 that is of the feedback circuit 500 and that is connected to the voltage regulation component 502 is not less than a level value of the other input terminal U1. The feedback circuit 500 outputs the second feedback signal (that is, a normal feedback signal, for example, a high-level signal), and the second feedback signal may enable the switch component 100 to connect the charging circuit to the power pin, or form the input path of the power input signal of the charging circuit. That is, the charging circuit 200 generates the charging voltage, and outputs the charging voltage to the power pin. When an abnormal short circuit occurs on the charging interface, that is, a short circuit occurs between the data transmission pins of the charging interface and a signal ground, a current passing through the sampling component 400 may abnormally increase, and therefore a level difference between the two terminals A1 and A2 of the sampling component 400 may exceed a preset threshold. This change causes a change of a value relationship between voltages on the two input terminals of the feedback circuit 500, that is, a level value on the input terminal U1 is greater than a level value on the other input terminal U2, and therefore the second feedback signal that is output by the output terminal U0 of the feedback circuit 500 may be changed to the first feedback signal (that is, an abnormal feedback signal, for example, a low-level signal). The first feedback signal may enable the switch component 100 to break the input path of the power input signal of the charging circuit, that is, the charging circuit cannot generate the charging voltage; or to directly disconnect the charging circuit from the power pin, so that the charger stops outputting the charging voltage. Therefore, short circuit detection and protection is implemented.

With reference to FIG. 7, in some embodiments, a capacitor $C_p$ is added between the terminal A1 of the sampling circuit 400 and the input terminal U1 of the feedback circuit 500, and the capacitor $C_p$ has a particular charging time. The feedback circuit 500 can output the first feedback signal (that is, the abnormal feedback signal) after a current on the terminal A1 of the sampling circuit 400 has changed for a particular time, so that erroneous detection caused by an interference signal is avoided. Therefore, the charger stops outputting the charging voltage.

In some embodiments, the detection signal that is output by the detection signal generation circuit 300 is an alternating current signal. The feedback circuit 500 may detect level signals on the two terminals of the sampling component 400 (for example, a current sensing resistor) for a plurality of times. According to a gradual charging principle of the capacitor $C_p$, only when duration during which the level signals meet the preset condition exceeds a preset time, or level signals obtained through at least N times of consecutive detections all meet the preset condition (a value of N may be adaptively adjusted and customized according to a design requirement), a responsive level value is reached on an input cable terminal of the feedback circuit, and a corresponding feedback signal is generated. Therefore, when detecting that the duration during which the level signals on the two terminals of the sampling component meet the preset condition exceeds the preset time or that the level signals obtained through the at least N times of consecutive detections all meet the preset condition, the feedback circuit 500 outputs the first feedback signal (that is, the abnormal feedback signal, for example, a low-level signal). Level signals on the two terminals of the sampling component 400 are detected for a plurality of times, so that sampling precision can be further improved, and erroneous determining likely to be caused by a single time of determining can be avoided. In addition, the detection signal that is output by the detection signal generation circuit 300 is the alternating current signal. The alternating current signal has low energy, and therefore causes no damage to a cable.

When no data needs to be transmitted, no data signal exits on the data transmission pins D+ and D− for connection. As a result, impedance between the data transmission pins D+ and D− and the ground pin GND is extremely high or the data transmission pins D+ and D− are directly disconnected from the ground pin GND, and therefore signal values of the level signals on the sampling component 400 are less than a preset threshold or even are 0. When water enters the charging interface 700 or a foreign matter causing a short circuit exists on the charging interface 700, the data transmission pins D+ and D− are connected to the ground pin GND, to form a short circuit or a low-impedance closed circuit, that is, impedance between the data transmission pins D+ and D− and the ground pin GND decreases. Therefore, a current loop is formed among the detection signal generation circuit, the sampling component, the data transmission pins, and the GND pin. In this case, based on the detection signal that is output by the detection signal generation circuit, the level signals on the two terminals of the sampling component are greater than a preset threshold. A preset condition is set, and the preset condition may be that the level signals are greater than a preset threshold. Therefore, when the level signals meet the preset condition (that is, the level signals are greater than the preset threshold), the feedback circuit 500 generates the first feedback signal; or when the level signals do not meet the preset condition (that is, the level signals are less than the preset threshold), the feedback circuit 500 generates the second feedback signal. In some embodiments, the first feedback signal is a high-level signal and the second feedback signal is a low-level signal; or the first feedback signal is a low-level signal and the second feedback signal is a high-level signal.

The switch component 100 is connected in series to a power input cable of the charging circuit 200 or is connected in series to a connection cable between the charging circuit 200 and the power pin Vbus, and the switch component 100 is configured to: receive the feedback signal, and control, according to the feedback signal, the charger to output the charging voltage.

In some embodiments, a manner in which the switch component 100 controls the charger to stop outputting the charging voltage may include: breaking the input path of the power input signal of the charging circuit 200, to control the charging circuit 200 to stop a charging conversion work; or disconnecting the charging circuit 200 from the power pin Vbus, to stop the charging circuit 200 from outputting the charging voltage output to the power pin Vbus.

In some embodiments, the switch component 100 may be a component that can be used as a switch, such as a transistor or a field effect transistor, and the charging voltage is cut off by directly breaking a signal path.

Figure 4:
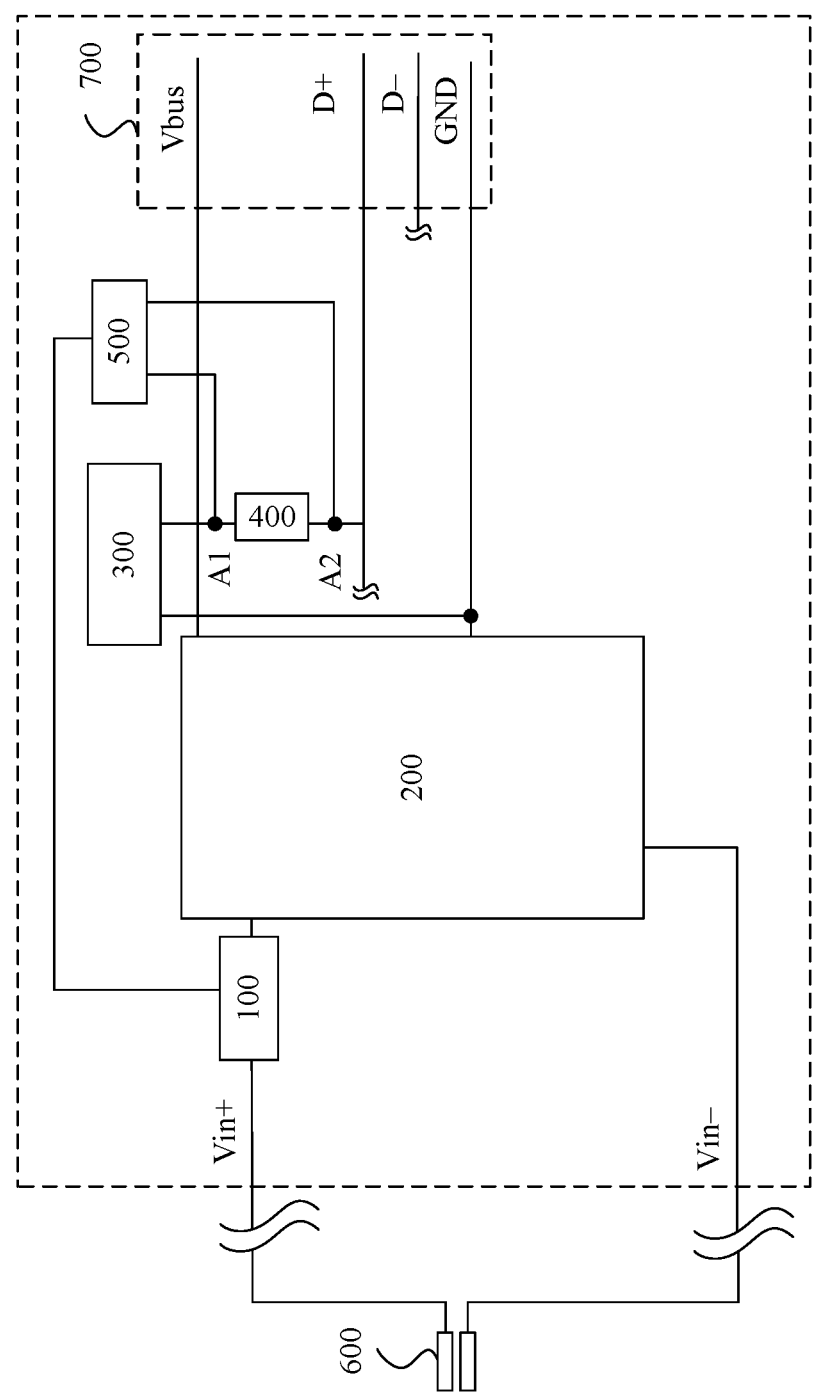

Specifically, with reference to FIG. 1 to FIG. 3, the switch component 100 may alternatively be connected in series to the power input cable Vin− of the charging circuit 200. Alternatively, as shown in FIG. 4, the switch component 100 is connected in series to the power input cable Vin+ of the charging circuit 200. The switch component 100 breaks the input path of the power input signal of the charging circuit 100 according to the first feedback signal, so that the charging circuit 100 stops generating the charging voltage; or forms the input path of the power input signal of the charging circuit 100 according to the second feedback signal, so that the charging circuit 100 generates the charging voltage and outputs the charging voltage through the power pin Vbus.

Figure 5:
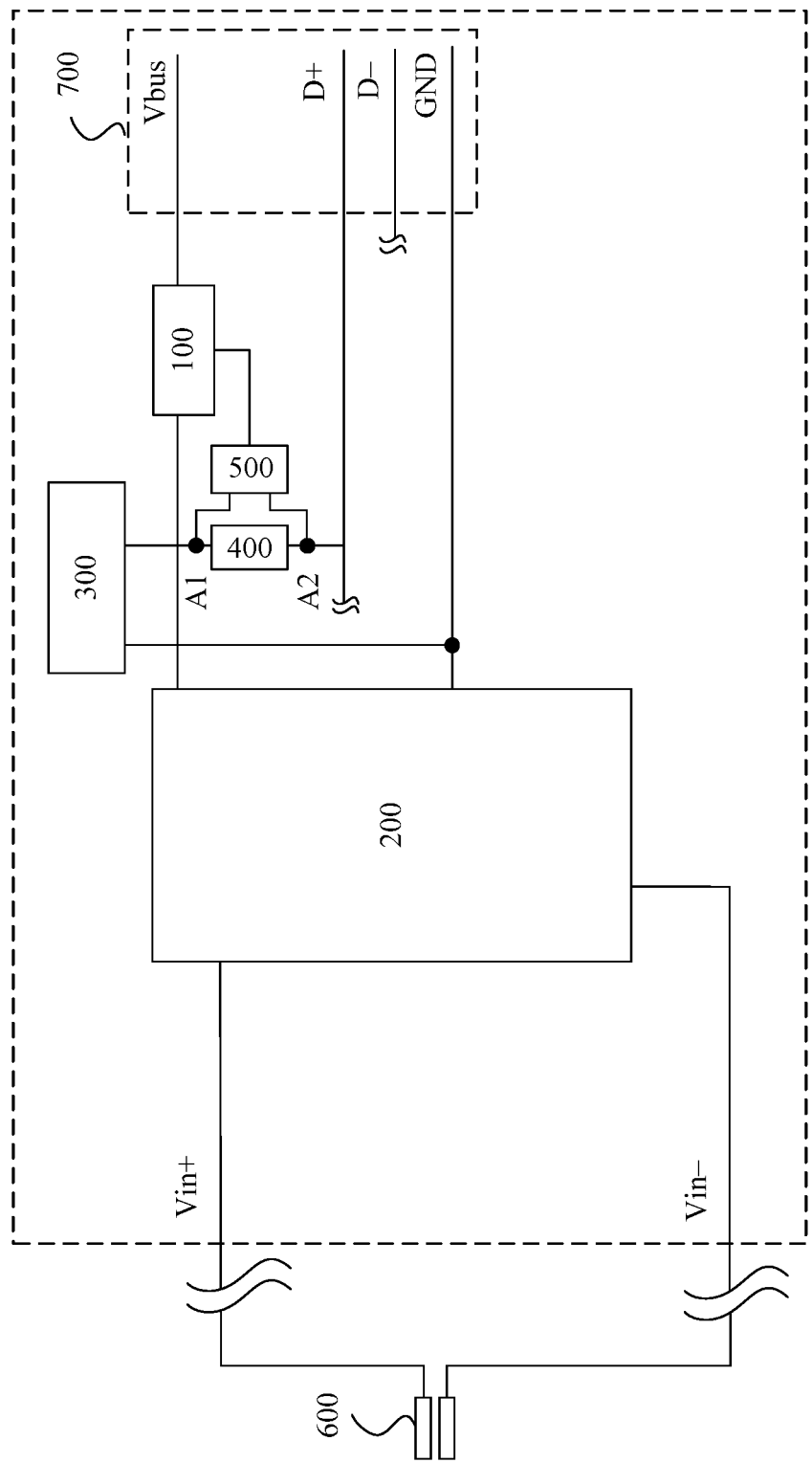

In some embodiments, as shown in FIG. 5, the switch component 100 is connected in series to the connection cable between the charging circuit 200 and the power pin Vbus, and the switch component 100 disconnects the charging circuit 200 from the power pin Vbus according to the first feedback signal, so that the power pin Vbus stops outputting a charging signal; or the switch component 100 connects the charging circuit 200 to the power pin Vbus according to the second feedback signal.

In addition, in some embodiments, when the switch component 100 is disposed on the power input cable Vin+ of the charging circuit 200, the sampling component 400 is connected in series to an output cable of the detection signal generation circuit 300, and the output cable may be the output cable connected to the data transmission pin D− or the output cable connected to the data transmission pin D+. In some embodiments, when the switch component 100 is disposed on the connection cable between the charging circuit 200 and the power pin Vbus, the sampling component 400 may also be connected in series to an output cable of the detection signal generation circuit 300, and the output cable may be the output cable connected to the data transmission pin D− or the output cable connected to the data transmission pin D+.

In some embodiments, the switch component wo may alternatively be a PWM circuit, and the PWM circuit is configured to generate a PWM signal. The PWM signal is preferably a square wave signal, and the PWM signal can control the charging circuit 200 to generate the charging voltage.

Specifically, the PWM circuit outputs the PWM signal according to the second feedback signal, and the charging circuit 200 can normally generate the charging voltage according to the PWM signal, that is, provide the charging voltage to the power pin Vbus. According to the first feedback signal, the PWM circuit stops outputting the PWM signal or adjusts a duty cycle of the PWM signal to 0 or 100%, so that the charging circuit 200 stops outputting the charging voltage, that is, stops providing the charging voltage to the power pin Vbus.

Figure 8:
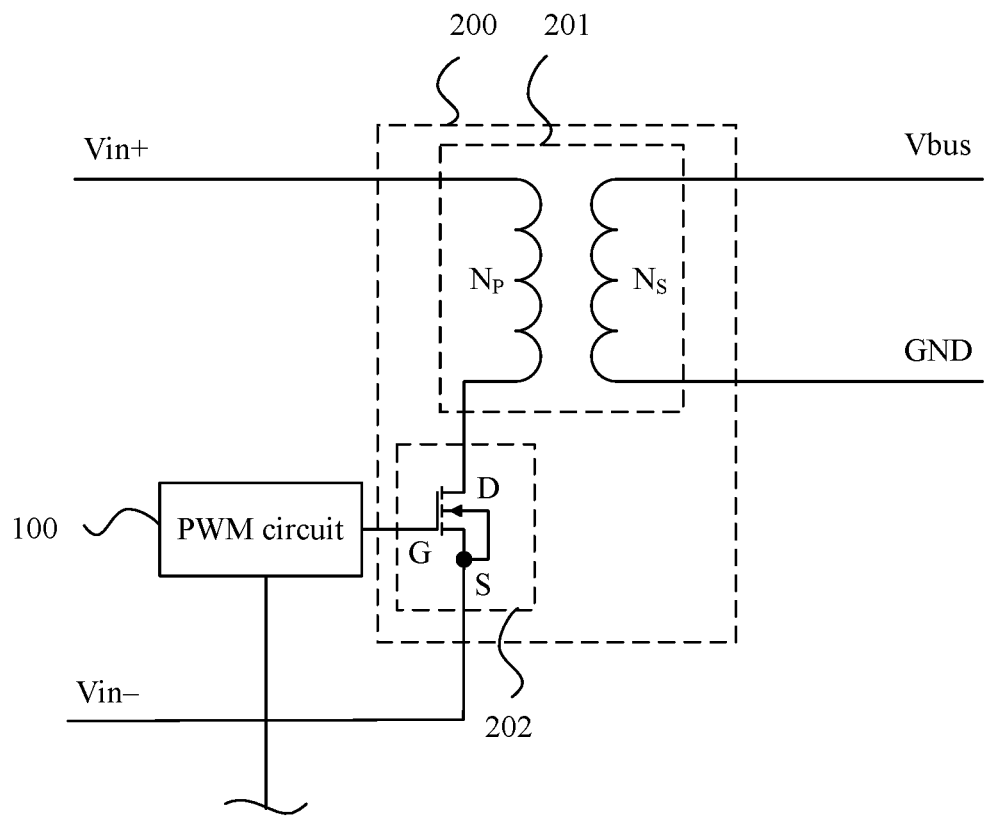
FIG. 8 is a structural block diagram of examples of a charging circuit and a switch component according to some embodiments.

For example, the switch component 100 is the PWM circuit, and is connected in series to the input cable Vin− of the charging circuit. FIG. 8 is a structural block diagram of an example of the charging circuit 200 according to some embodiments. The charging circuit 200 includes a switch element 202 and a transformer 201. The switch element 202 is separately connected to the switch component 100, a primary side of the transformer 201, and the power input cable Vin+. The switch element 202 periodically controls, according to the PWM signal, the primary side of the transformer 201 to receive an input signal. Two output terminals of a secondary side of the transformer are respectively connected to the power pin Vbus and the ground pin GND; and generate the charging voltage according to the input signal received by the primary side of the transformer, and output the charging voltage to the power pin Vbus.

With reference to FIG. 6, the power input signal is input from an input terminal of the primary side $N_P$ of the transformer, and with periodical turning-on or turning-off of the switch element 202, the secondary side $N_S$ of the transformer generates an output signal through sensing. The switch component 100 sends the PWM signal to the switch element 202, to control periodical turning-on or turning-off of the switch element 202. If the switch component stops sending a square wave signal, the secondary side $N_S$ of the transformer 201 cannot generate an output current through sensing, and therefore the charger stops outputting the charging voltage. In some embodiments, one terminal of the primary side $N_P$ of the transformer 201 is connected to the power input cable Vin+, and the other terminal is connected to the other power input cable Vin− through the main switch transistor. One terminal of the secondary side $N_S$ of the transformer 201 is connected to the power pin Vbus, and the other terminal is connected to the ground pin GND.

In some embodiments, the switch element 202 is an NMOS transistor, including a gate G, a source S, and a drain D. The gate G is connected to the switch component 100, the source S is connected to the power input cable Vin−, and the drain D is connected to the primary side $N_P$ of the transformer. The switch component 100 sends a control signal to the switch element 202 through the gate G.

As described in the foregoing embodiments, the control signal is a square wave signal. When the square wave signal is at a high level, the drain D and the gate G of the NMOS transistor are turned on; or when the square wave signal is at a low level, the drain D and the gate G of the NMOS transistor are turned off.

With reference to the foregoing embodiments, the charger includes an abnormality protection circuit formed by the switch component 100, the detection signal generation circuit 300, the sampling component 400, and the feedback circuit 500, to avoid a damage to the charger or a charged device that is caused by an abnormal impedance decrease due to entry of water or a foreign matter.

In addition, the detection signal generation circuit 300 may continuously or periodically send detection signals, and the feedback circuit 500 continuously or periodically obtains level signals on the two terminals of the sampling component 400 and sends a feedback signal to the switch component 100.

Some embodiments provide a method for implementing charging abnormality protection by using the charger described in the foregoing embodiments. The method includes the following steps:

Step S11: The detection signal generation circuit 300 sends a detection signal.

Step S12: The feedback circuit 500 obtains level signals from the sampling component 400, and generates a feedback signal according to the level signals.

Step S14: The switch component 100 receives the feedback signal, and controls, according to the feedback signal, the charger to output a charging voltage.

When the level signals meet a preset condition, the feedback circuit 500 generates a first feedback signal, and the switch component 100 controls, according to the first feedback signal, the charger to stop outputting the charging voltage; or when the level signals do not meet the preset condition, the feedback circuit 500 generates a second feedback signal, and the switch component 100 controls, according to the second feedback signal, the charger to output the charging voltage.

In conclusion, the foregoing embodiments are merely used for describing the technical solutions of the present invention, but are not intended to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof. The modifications or the replacements should not cause the essence of the corresponding technical solutions to depart from the spirit and the scope of the technical solutions of the embodiments of the present invention.

All or some functions of the detection signal generation circuit, the sampling component, the feedback circuit, the switch component, the charging circuit, the voltage regulation component, and the capacitor in the embodiments of the present invention may be implemented by a processor or a controller chip, or may be implemented by separate components.

A value relationship between levels, a value relationship between voltages, and a high/low state of a logical level in the embodiments of the present invention are merely an implementation of the embodiments of the present invention, and parameter values may be appropriately adjusted according to a circuit requirement.

In the embodiments, a reference voltage not only may represent a reference voltage source, but also may represent a level value of a reference voltage. The value relationship between levels in the embodiments of the present invention is merely an implementation of the embodiments of the present invention, and parameter values may be appropriately adjusted according to a circuit requirement.

The terms used in the embodiments of the present invention are merely for the purpose of illustrating specific embodiments, and are not intended to limit the present invention. The terms "a", "said", and "the" of singular forms used in the embodiments and the appended claims of the present invention are also intended to include plural forms, unless otherwise specified in the context clearly. It should also be understood that, the term "and/or" used herein indicates and includes any one or all of possible combinations of one or more associated listed items.

It should be noted that in the embodiments of the present invention, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes . . . " or "contains . . . " does not, without more constraints, preclude the presence of additional identical elements in the process, method, article, or device that includes the element.

Persons of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

In the foregoing specific implementations, the objective, technical solutions, and benefits of the present invention are further described in detail. It should be understood that different embodiments can be combined. The foregoing descriptions are merely specific implementations of the present invention, but are not intended to limit the protection scope of the present invention. Any combination, modification, equivalent replacement, or improvement made without departing from the spirit and principle of the present invention should fall within the protection scope of the present invention. The sequence numbers of the foregoing embodiments of the present invention are merely for illustrative purposes, and are not intended to indicate priorities of the embodiments.

What is claimed is:

1. A charger, comprising:
a detection signal generation circuit;
a sampling circuit;
a feedback circuit;
a first switch;
a charging circuit; and
a charging interface;
wherein the charging interface comprises a plurality of data transmission pins and a power pin;
wherein the charging circuit is configured to:
receive a power input signal; and
generate a charging voltage according to the power input signal, wherein the charging voltage is output through the power pin;
wherein the detection signal generation circuit is configured to output a detection signal, wherein an output terminal of the detection signal generation circuit is connected to a first data transmission pin of the plurality of data transmission pins;
wherein the sampling circuit is connected in series to an output cable of the detection signal generation circuit;
wherein the feedback circuit is connected to the sampling circuit and the first switch, and the feedback circuit is configured to:
detect level signals on two terminals of the sampling circuit;
generate a feedback signal according to the level signals; and
transfer the feedback signal to the first switch; and
wherein the first switch is connected in series to a power input cable of the charging circuit, or the first switch is connected in series to a connection cable between the charging circuit and the power pin;
wherein the first switch is configured to:
receive the feedback signal; and
control, according to the feedback signal, the charger to output the charging voltage; and
wherein:
when the level signals meet a preset condition, the feedback circuit is configured to generate a first feedback signal, and the first switch is configured to control, according to the first feedback signal, the charger to stop outputting the charging voltage; or
when the level signals do not meet the preset condition, the feedback circuit is configured to generate a second feedback signal, and the first switch is configured to control, according to the second feedback signal, the charger to output the charging voltage.

2. The charger according to claim 1, wherein:
the first switch is connected in series to the connection cable between the charging circuit and the power pin; and
the first switch is configured to disconnect the charging circuit from the power pin according to the first feedback signal, or the first switch is configured to connect the charging circuit to the power pin according to the second feedback signal.

3. The charger according to claim 1, wherein:
the first switch is connected in series to the power input cable of the charging circuit; and
the first switch is configured to break an input path of the power input signal of the charging circuit according to the first feedback signal, or the first switch is configured to form an input path of the power input signal of the charging circuit according to the second feedback signal.

4. The charger according to claim 3, wherein the first switch is a pulse width modulation (PWM) circuit, and the PWM circuit is configured to generate a PWM signal.

5. The charger according to claim 4, wherein the PWM circuit is configured to:
according to the first feedback signal, stop outputting the PWM signal, or to adjust a duty cycle of the PWM signal to 0 or 100%, to control the charging circuit to stop generating the charging voltage.

6. The charger according to claim 4, wherein the PWM circuit is configured to output the PWM signal according to the second feedback signal, to control the charging circuit to generate the charging voltage.

7. The charger according to claim 4, wherein the PWM signal is a square wave signal.

8. The charger according to claim 7, wherein:
the charging circuit comprises a second switch and a transformer;
the second switch is connected to a primary side of the transformer, and the second switch is configured to receive the PWM signal, and is configured to be periodically turned off or turned on according to the PWM signal, to control the primary side of the transformer to receive the power input signal; and
a secondary side of the transformer is configured to generate the charging voltage according to the power input signal received by the primary side of the transformer, and is configured to output the charging voltage through the power pin.

9. The charger according to claim 1, wherein:
the feedback circuit is a comparator circuit, an operational amplifier circuit, or an analog-to-digital conversion circuit; and
two input terminals of the feedback circuit are respectively connected to the two terminals of the sampling circuit, to obtain the level signals, and an output terminal of the feedback circuit is connected to the first switch, to transfer the feedback signal to the first switch.

10. The charger according to claim 9, further comprising:
a voltage regulator, wherein the voltage regulator is connected in series to an input cable of the feedback circuit.

11. The charger according to claim 10, wherein the voltage regulator is a reference voltage source.

12. The charger according to claim 1, further comprising:
a capacitor, wherein the capacitor is connected in series to an input cable of the feedback circuit.

13. The charger according to claim 1, wherein the detection signal generation circuit comprises a direct current signal generation circuit.

14. The charger according to claim 1, wherein the detection signal generation circuit comprises a square wave signal generation circuit.

15. The charger according to claim 1, wherein the detection signal generation circuit comprises a pulse signal generation circuit.

16. The charger according to claim 1, wherein the detection signal generation circuit comprises a half-wave signal generation circuit.

17. The charger according to claim 1, wherein the detection signal generation circuit is configured to periodically output detection signals.

18. The charger according to claim 1, wherein the sampling circuit is a sampling resistor.

19. The charger according to claim 1, wherein the sampling circuit is a sampling inductor.

\* \* \* \* \*